(12) United States Patent
Min

(10) Patent No.: US 12,538,190 B2
(45) Date of Patent: Jan. 27, 2026

(54) RADIO BASE STATION, RADIO COMMUNICATION SYSTEM, AND RADIO COMMUNICATION METHOD

(71) Applicant: NTT DOCOMO, INC., Tokyo (JP)

(72) Inventor: Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 372 days.

(21) Appl. No.: 18/250,418

(22) PCT Filed: Nov. 4, 2021

(86) PCT No.: PCT/JP2021/040630
§ 371 (c)(1),
(2) Date: Apr. 25, 2023

(87) PCT Pub. No.: WO2022/097686
PCT Pub. Date: May 12, 2022

(65) Prior Publication Data
US 2024/0007911 A1  Jan. 4, 2024

(30) Foreign Application Priority Data

Nov. 4, 2020 (JP) .................................. 2020-184724

(51) Int. Cl.
*H04W 36/00* (2009.01)
(52) U.S. Cl.
CPC .............................. *H04W 36/0064* (2023.05)
(58) Field of Classification Search
CPC .................................................. H04W 36/0064
See application file for complete search history.

(56) References Cited

U.S. PATENT DOCUMENTS

| | | | |
|---|---|---|---|
| 2023/0085746 A1* | 3/2023 | Wu | H04W 76/15 370/331 |
| 2023/0171652 A1* | 6/2023 | Zhang | H04W 36/0061 370/331 |
| 2023/0300691 A1* | 9/2023 | Eklöf | H04W 36/0061 370/331 |
| 2023/0370936 A1* | 11/2023 | Eklöf | H04W 36/00692 |
| 2025/0142425 A1* | 5/2025 | Wang | H04W 12/04 |
| 2025/0168721 A1* | 5/2025 | Wang | H04W 36/0069 |

OTHER PUBLICATIONS

Huawei; "Revised WID on Further Multi-RAT Dual-Connectivity enhancements"; 3GPP TSG RAN Meeting #88e, RP-201040; Electronic Meeting; Jun. 29-Jul. 3, 2020 (4 pages).
Written Opinion issued in corresponding International Application No. PCT/JP2021/040630, mailed on Feb. 8, 2022 (3 pages).

(Continued)

*Primary Examiner* — Barry W Taylor
(74) *Attorney, Agent, or Firm* — Osha Bergman Watanabe & Burton LLP

(57) ABSTRACT

A radio base station (MN) receives the configuration information related to the secondary cell group and executes the conditional adding/modifying procedure of the secondary cell based on the received configuration information. The radio base station receives configuration information including execution condition of a secondary cell group and identification information of a secondary cell from a plurality of secondary nodes.

4 Claims, 9 Drawing Sheets

(56) References Cited

OTHER PUBLICATIONS

International Search Report issued in corresponding International Application No. PCT/JP2021/040630, mailed on Feb. 8, 2022 (3 pages).
Qualcomm Incorporated "Signaling related to Conditional PSCell addition/change configuration"; 3GPP TSG-RAN WG3 Meeting #110-e, R3-206178; E-Meeting; Nov. 2-12, 2020 (8 pages).
Office Action issued in Japanese Patent Application No. 2022-560810, dated Jun. 24, 2025 (8 pages).
3GPP TSG-RAN WG3 Meeting #110-e; R3-206344; Huawei; "Discussion on Support of conditional PSCell change/addition"; E-meeting, Nov. 2-12, 2020 (9 pages).
3GPP TSG-RAN WG3 Meeting #110-e; R3-206345; Huawei; "Support of conditional PSCell change/addition"; E-meeting, Nov. 2-12, 2020 (5 pages).

\* cited by examiner

FIG. 7A

CG-Config message

```
-- ASN1START
-- TAG-CG-CONFIG-START

CG-Config-v1620-IEs ::=       SEQUENCE {
    ueAssistanceInformationSCG-r16    OCTET STRING (CONTAINING UEAssistanceInformation) OPTIONAL,
    nonCriticalExtension              CG-Config-v17xy-IEs                                OPTIONAL
}

CG-Config-v17xy-IEs ::=       SEQUENCE {
    condSCG-CellGroupConfigToAddModList       SEQUENCE (SIZE (1.. maxNrofConditionalPSCell)-1) OF condSCG-CellGroupConfig,
    condSCG-CellGroupConfigToRemoveList       SEQUENCE (SIZE (1.. maxNrofConditionalPSCell)-1) OF condSCG-CellGroupConfigId,
    condSCG-RB-ConfigToAddModList             SEQUENCE (SIZE (1.. maxNrofConditionalPSCell)-1) OF condSCG-RB-Config,
    condSCG-RB-ConfigToRemoveList             SEQUENCE (SIZE (1.. maxNrofConditionalPSCell)-1) OF condSCG-RB-ConfigId,
    condEUTRExecutionConditionToAddModList    SEQUENCE (SIZE (1.. maxNrofConditionalPSCell)-1) OF condExecutionCondition,
    condSCGExecutionConditionToAddModList     SEQUENCE (SIZE (1.. maxNrofConditionalPSCell)-1) OF condSCGExecutionConditionId,
    condSCGExecutionCondition                 OCTET STRING (CONTAINING condExecutionConditionAddModList),
    conditionalReconfigurationSCG             OCTET STRING (CONTAINING Conditional Reconfiguration or RRCReconfiguration),
    measConfigSourceSCG                       MeasConfig or OCTET STRING (CONTAINING MeasConfig),
    nonCriticalExtension                      SEQUENCE {}
}
```

FIG. 7B

```
CondSCG-CellGroupConfig ::=     SEQUENCE {
    condSCG-CellGroupConfigId       INTEGER (1..maxNrofConditionalPSCell-1),
    pSCellID                        CellIdentity,
    scg-CellGroupConfig             OCTET STRING (CONTAINING RRCReconfiguration),
    ...
}

CondSCG-RR-Config ::=           SEQUENCE {
    condSCG-RR-ConfigId             INTEGER (1..maxNrofConditionalPSCell-1),
    pSCellID                        CellIdentity,
    scg-RR-Config                   OCTET STRING (CONTAINING RadioBearerConfig),
    ...
}

CondSCGExecutionCondition ::=   SEQUENCE {
    condSCGExecutionConditionId     INTEGER (1..maxNrofConditionalPSCell-1),
    physCellId                      PhysCellId,
    pSCellID                        CellIdentity,
    condExecutionCond-r16           SEQUENCE (SIZE (1..2)) OF MeasId,
    ...
}

CondExecutionCondSCGToAddModList ::= SEQUENCE (SIZE (1..maxNrofConditionalPSCell-r17)) OF CondExecutionCondSCG
SEQUENCE {
    condSCGExecutionCondId          INTEGER (1..maxNrofConditionalPSCell-1)
```

RADIO BASE STATION, RADIO COMMUNICATION SYSTEM, AND RADIO COMMUNICATION METHOD

TECHNICAL FIELD

The present disclosure relates to a radio base station, radio communication system, and radio communication method that support procedures for adding and modifying secondary cells (secondary nodes).

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

For example, in Release-17 of 3GPP, expansion of Multi-RAT Dual Connectivity (MR-DC) is being considered (Non-Patent Literature 1). Concretely, in order to realize more efficient addition or change of Primary SCell (PSCell), support of a conditional secondary cell (secondary node) addition/change procedure with a simplified procedure is being studied.

CITATION LIST

Non-Patent Literature

Non-Patent Literature 1 "Revised WID on Further Multi-RAT Dual-Connectivity enhancements", RP-201040, 3GPP TSG RAN Meeting #88e, 3GPP, June 2020

SUMMARY OF INVENTION

However, the above-mentioned conditional PSCell addition/change has the following problems. Specifically, the PSCell addition specified in Release-15 of the 3GPP includes a CG-Config in the SN Addition Request Ack, and the CG-Config corresponds to only one RRC Reconfiguration of the PSCell.

On the other hand, in the conditional PSCell addition/change, the target secondary node (T-SN) can notify the master node (MN) of a plurality of PSCell configurations.

However, the MN has a problem that the existing CG-Config (configuration information) corresponds to one PSCell and it is not easy to configure a plurality of PSCells even if the existing CG-Config is used.

Accordingly, the following disclosure has been made in view of such a situation, and an object of the present invention is to provide a radio base station, a radio communication system, and a radio communication method capable of surely adding or changing a secondary cell corresponding to a plurality of configuration information even when a procedure for adding or changing a conditional secondary cell (secondary node) is applied in a dual connectivity.

One aspect of the present disclosure is a radio base station (eNB 100 A) including a reception unit (DC processing unit 130) that receives configuration information related to a secondary cell group, and a control unit (control unit 140) that performs a conditional adding/modifying procedure of a secondary cell based on the configuration information. The reception unit receives the configuration information including execution conditions of the secondary cell group and identification information of the secondary cell from a plurality of secondary nodes.

BRIEF DESCRIPTION OF DRAWINGS

FIG. 7A is a diagram showing a configuration example of a CG-Config (part).

FIG. 7B is a diagram showing a configuration example of a CG-Config (part).

MODES FOR CARRYING OUT THE INVENTION

Figure 1:
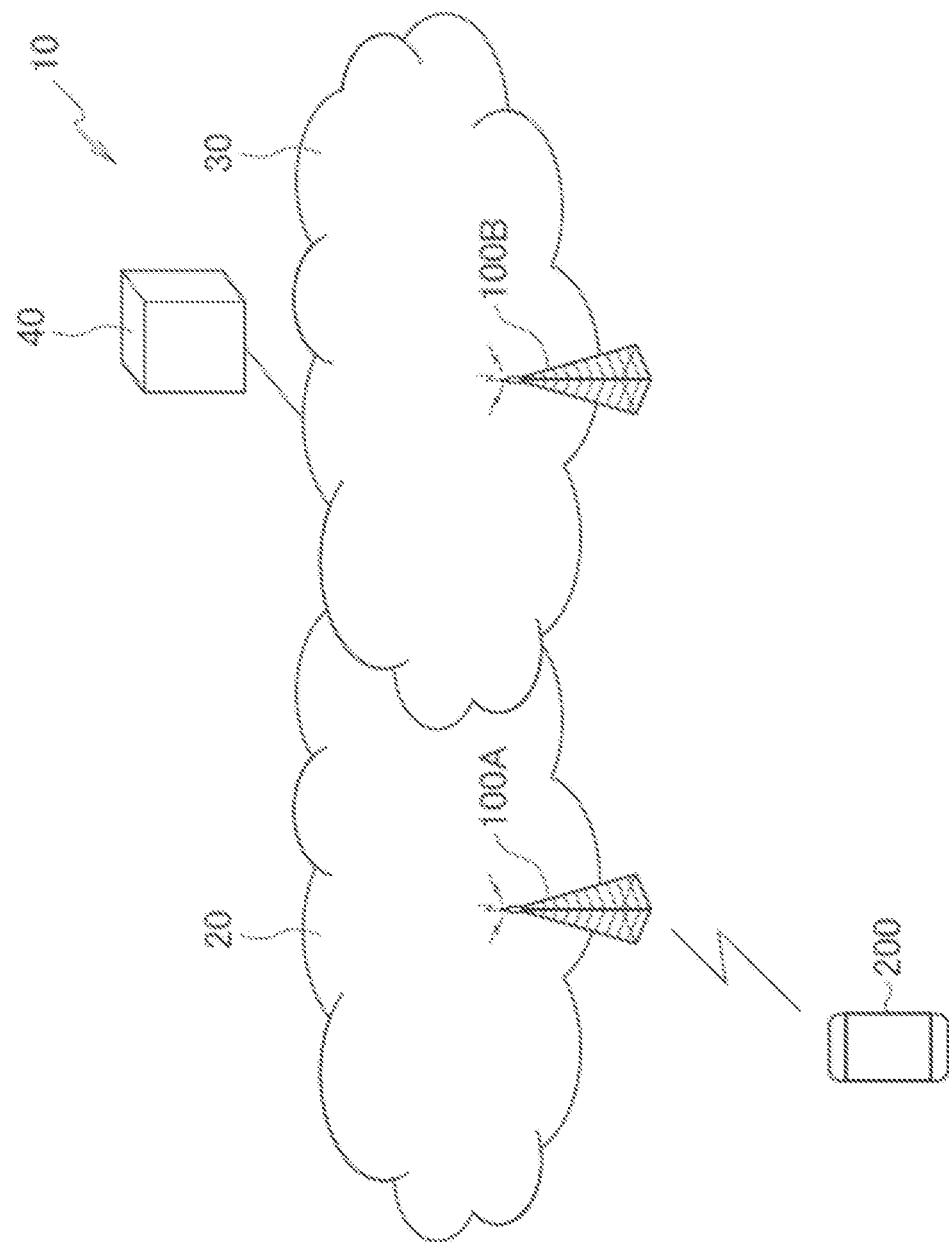
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic configuration diagram of a radio communication system 10 according to this embodiment. The radio communication system 10 is radio communication system according to Long Term Evolution (LTE) and 5G New Radio (NR). Note that LTE may be referred to as 4G and NR may be referred to as 5G. The radio communication system 10 may also be a radio communication system following a scheme called Beyond 5G, 5G Evolution or 6G.

LTE and NR may be interpreted as radio access technologies (RAT), and in this embodiment, LTE may be referred to as a first radio access technology and NR may be referred to as a second radio access technology.

The radio communication system 10 includes the Evolved Universal Terrestrial Radio Access Network 20 (E-UTRAN 20) and the Next Generation-Radio Access Network 30 (hereinafter NG RAN 30). The radio communication system 10 also includes a terminal 200 (UE 200, User Equipment).

The E-UTRAN 20 includes an eNB 100 A which is a radio base station according to LTE. NG RAN 30 includes gNB 100 B which is a radio base station in accordance with 5 G (NR). The E-UTRAN 20 and the NG RAN 30 (which may be eNB 100 A or gNB 100 B) may simply be referred to as a network.

The eNB 100 A, the gNB 100 B, and the UE 200 can support carrier aggregation (CA) using a plurality of component carriers (CCs), dual connectivity for simultaneously transmitting component carriers between a plurality of NG-RAN nodes and the UE, and the like.

The eNB 100 A, gNB 100 B and UE 200 perform radio communication via a radio bearer, specifically, a Signalling Radio Bearer (SRB) or a DRB Data Radio Bearer (DRB).

In this embodiment, the eNB 100 A configures the master node (MN) and the gNB 100 B configures the secondary node (SN) to execute Multi-Radio Dual Connectivity (MR-DC), specifically, E-UTRA-NR Dual Connectivity (EN-DC).

That is, the UE 200 corresponds to dual connectivity connecting the eNB 100 A and the gNB 100 B.

The eNB 100 A is included in the master cell group (MCG), and the gNB 100 B is included in the secondary cell group (SCG). That is, the gNB 100 B is an SN included in the SCG.

The eNB 100 A and gNB 100 B may be referred to as radio base stations or network devices.

In addition, conditional PSCell addition/change of Primary SCell (PSCell) may be supported in radio communication system 10. PSCell is a type of secondary cell. PSCell means Primary SCell (secondary cell), and it may be interpreted that any SCell among a plurality of SCells corresponds to it.

The secondary cell may be read as a secondary node (SN) or a secondary cell group (SCG). Conditional PSCell addition/change may allow efficient and rapid addition or modification of secondary cells.

The conditional PSCell addition/change may be interpreted as a simplified conditional secondary cell addition/change procedure.

The secondary cell may be read as a secondary node (SN) or a secondary cell group (SCG). Conditional PSCell addition/change may allow efficient and rapid addition or modification of secondary cells.

The radio communication system 10 may also support conditional inter-SN PSCell change procedures. Specifically, MN-initiated conditional inter-SN PSCell change and/or SN-initiated conditional inter-SN PSCell change may be supported.

(2) Function Block Configuration of Radio Communication System

Next, the functional block configuration of radio communication system 10 will be described. Specifically, the functional block configurations of the eNB 100 A and the UE 200 will be described.

(2.1) eNB 100A

Figure 2:
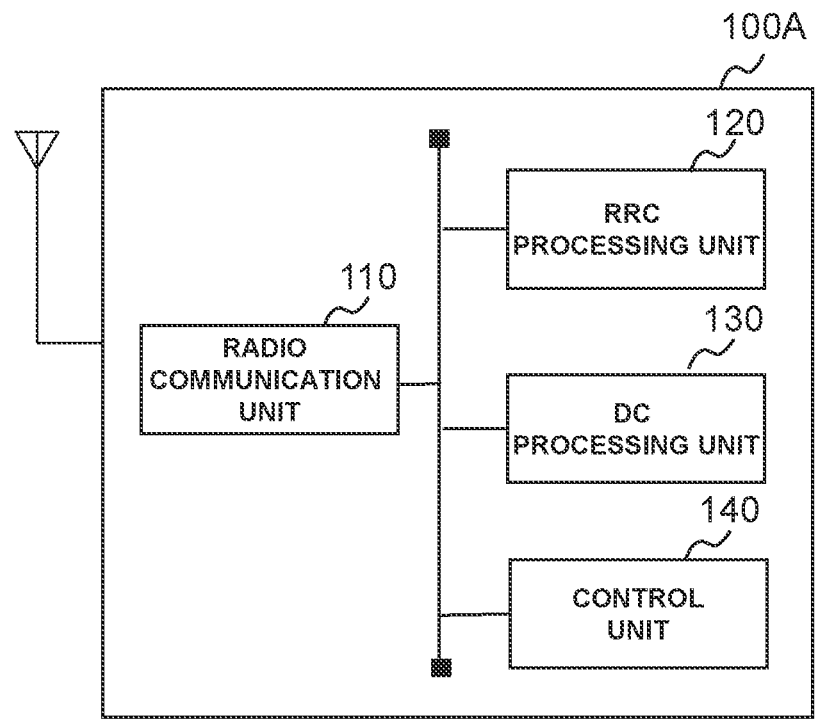
FIG. 2 is a functional block diagram of the eNB 100 A.

FIG. 2 is a functional block diagram of the eNB 100 A. As shown in FIG. 2, the eNB 100 A includes a radio communication unit 110, an RRC processing unit 120, a DC processing unit 130, and a control unit 140.

The radio communication unit 110 transmits a downlink signal (DL signal) in accordance with LTE. The radio communication unit 110 receives an uplink signal (UL signal) in accordance with LTE.

The RRC processing unit 120 executes various processes in the radio resource control layer (RRC). Specifically, the RRC processing unit 120 can transmit the RRC Reconfiguration to the UE 200. The RRC processing unit 120 can receive the RRC Reconfiguration Complete, which is a response to the RRC Reconfiguration, from the UE 200.

In this embodiment, the eNB 100 A supports LTE, but in this case, the name of the RRC message may be RRC Connection Reconfiguration or RRC Connection Reconfiguration Complete.

The RRC processing unit 120 may include the cell ID of the target PSCell, for example, the cell global identifier (CGI), for each condReconfigId in the conditional Reconfiguration included in the RRC Reconfiguration. The UE 200 may configure the RRC layer by such Conditional Reconfiguration. Note that, instead of the CGI, information capable of identifying the SN (gNB 100 B) (which may be referred to as a gNB ID) may be used.

Further, the RRC processing unit 120 may determine the SN (T-SN) to be added or changed based on the cell ID (For example, NR Physical Cell ID (PCI), NR CGI, gNB ID, or condReconfigId) contained in the ULInformation Transfer MRDC message transmitted from the UE 200.

Note that a new RRC message may be used instead of the ULInformationTransferMRDC message. The RRC message may be referred to as a bye-message.

As will be described later, SgNB Reconfiguration complete may be transmitted to the T-SN under the control of control unit 140. The control unit 140 may also specify the T-SN based on the cell ID of the target PSCell transmitted from the UE 200 and the frequency band in the NR.

The DC processing unit 130 executes processing related to dual connectivity, specifically, Multi-RAT Dual Connectivity (MR-DC). In this embodiment, since the eNB 100 A supports LTE and the gNB 100 B supports NR, the DC processing unit 130 may execute processing related to E-UTRA-NR Dual Connectivity (EN-DC). The type of DC is not limited, and may correspond to, for example, NR-E-UTRA Dual Connectivity (NE-DC) or NR-NR Dual Connectivity (NR-DC).

The DC processing unit 130 can transmit/receive a message specified in the 3 GPP TS 37.340 or the like, and execute processing related to configuring and releasing DC between the eNB 100 A, the gNB 100 B and the UE 200.

In particular, in this embodiment, the DC processing unit 130 receives configuration information related to the secondary cell group (SCG). In this embodiment, the DC processing unit 130 constitutes a reception unit.

Specifically, the DC processing unit 130 can receive the CG-Config specified in the 3 GPP TS 38.331 from the secondary node (SN).

The CG-Config may be interpreted as a message used to transfer the SCG radio configuration generated by the SN (SgNB or SeNB). The CG-Config may also be used to request the gNB-DU (Distributed Unit) to perform a specific action by the gNB-CU (Central Unit), and may request the DU to perform a configuration of a new lower layer.

The CG-Config may be transmitted from the SN (SgNB or SeNB) to the MN (MeNB or MgNB) or from the CU to the DU.

The DC processing unit 130 can transmit the CG-ConfigInfo to the SN. CG-ConfigInfo may be used, for example, to establish, modify, or release an SCG so that the MN (MeNB or MgNB) requests the SN (SgNB or SeNB) to perform a specific action. CG-ConfigInfo may also be used, for example, to establish or modify an MCG or SCG because the CU requests the DU to perform a specific action. The CG-ConfigInfo may be transmitted from the MN (MeNB or MgNB) to the SN (SgNB or SeNB) or from the CU to the DU.

The DC processing unit 130 can receive CG-Config (configuration information) including SCG execution conditions and secondary cell identification information from a plurality of SNs. The identification information of the secondary cell may be PCI or CGI. Alternatively, other information may be used as long as it can identify the secondary cell (or secondary node).

Specifically, the DC processing unit 130 may receive the CG-Config from the source secondary node (S-SN) of the modification source of the UE 200 and the target secondary node (T-SN) of the modification destination of the terminal.

The control unit 140 controls each functional block constituting the eNB 100 A. In particular, in the present embodiment, the control for adding or changing the secondary node is executed.

Specifically, the control unit 140 can decide whether or not to execute the conditional PSCell addition/change (CPA/CPC) based on the measurement report from the UE 200.

When the control unit 140 determines the CPA/CPC, it may send an SN Addition Request to the target secondary node (T-SN). The control unit 140 may also receive an SN Addition Request Ack, which is a response to the SN Addition Request, from the T-SN.

Also, the control unit 140 may receive not only the CPA/CPC but also the SN change required from the S-SN when the source secondary node (S-SN) has determined the SN-initiated conditional inter-SN PSCell change (CPC). The control unit 140 may also send an SSN Addition Request to the T-SN in response to the SN change required.

The control unit 140 performs conditional secondary cell addition or modification procedures, specifically conditional PSCell addition/change, based on the CG-Config (configuration information) received from the secondary node.

Specifically, based on the CG-Config received from the source secondary node (S-SN) and the target secondary node (T-SN), control unit 140 can generate a radio resource control layer (RRC) reconfiguration message (RRC Reconfiguration) and send it to the UE 200.

In this embodiment, the channel includes a control channel and a data channel. The control channels include PDCCH (Physical Downlink Control Channel), PUCCH (Physical Uplink Control Channel), PRACH (Physical Random Access Channel), PBCH (Physical Broadcast Channel), and the like.

The data channels include PDSCH (Physical Downlink Shared Channel) and PUSCH (Physical Uplink Shared Channel).

The reference signals include a Demodulation reference signal (DMRS), a Sounding Reference Signal (SRS), a Phase Tracking Reference Signal (PTRS), and a Channel State Information-Reference Signal (CSI-RS). The data may refer to data transmitted via a data channel.

(2.2) UE 200

Figure 3:
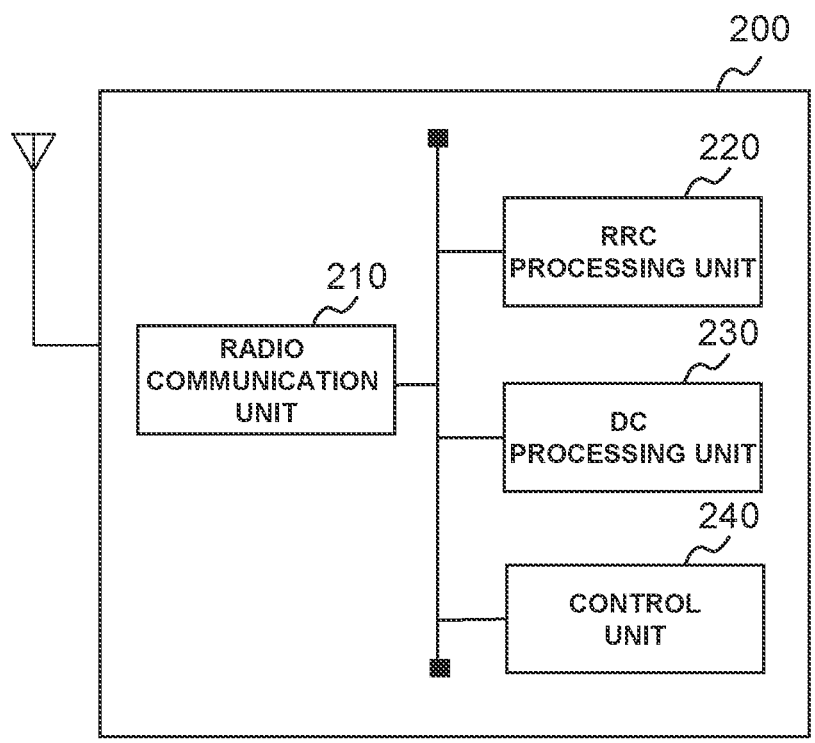
FIG. 3 is a functional block diagram of the UE 200.

FIG. 3 is a functional block diagram of the UE 200. As shown in FIG. 3, the UE 200 includes a radio communication unit 210, an RRC processing unit 220, a DC processing unit 230, and a control unit 240.

The radio communication unit 210 transmits an uplink signal (UL signal) in accordance with LTE or NR. The radio communication unit 210 receives an uplink signal (UL signal) in accordance with LTE. That is, the UE 200 can access the eNB 100 A (E-UTRAN 20) and the gNB 100 B (NG RAN 30), and can support dual connectivity (Specifically, EN-DC).

The RRC processing unit 220 executes various processes in the radio resource control layer (RRC). Specifically, the RRC processing unit 220 can transmit and receive messages of the radio resource control layer. In this embodiment, the RRC processing unit 220 may constitute a transmission/reception unit.

As described above, the RRC processor 220 can receive the RRC Reconfiguration from the network, specifically the E-UTRAN 20 (or NG RAN 30). The RRC processing unit 220 can transmit the RRC Reconfiguration Complete, which is a response to the RRC Reconfiguration, to the network.

In the present embodiment, the RRC processing unit 220 may transmit dual connectivity information including a radio resource control layer resetting completion message to the network in the secondary cell addition/change procedure.

Specifically, the RRC processing unit 220 may transmit a ULInformationTransferMRDC message including RRC Reconfiguration Complete to the network. As described above, RRC Reconfiguration Complete may be RRC Connection Reconfiguration Complete.

A normal UL information transfer may be used instead of the ULInformationTransferMRDC.

Alternatively, in the conditional PSCell addition/change, the RRC processing unit 220 may transmit another message of the radio resource control layer including a resetting completion message of the radio resource control layer to the network.

Specifically, the RRC processing unit 220 may transmit a new RRC message (bye-message) to the RRC layer including the RRC Reconfiguration Complete, or may use an existing message of the RRC layer to include the RRC Reconfiguration Complete (That is, it is embedded.).

Further, the RRC processing unit 220 may receive a message of the radio resource control layer including identification information of SCell (which may include PSCell) or a radio base station (gNB) forming the SCell.

Specifically, the RRC processing unit 220 may receive the RRC Reconfiguration including the CGI (or gNB ID) of the target PSCell as the identification information. In accordance with the received RRC Reconfiguration, the RRC processing unit 220 may transmit dual connectivity information including the CGI (or gNB ID), specifically, the ULInformationTransferMRDC message to the network.

Alternatively, the RRC processing unit 220 may transmit another message of the RRC layer including the CGI (or gNB ID), specifically, the new RRC message (bye-message) described above, to the network in accordance with the received RRC Reconfiguration.

The DC processing unit 230 executes processing related to dual connectivity, specifically, MR-DC. As described above, in the present embodiment, the DC processing unit 230 may execute processing relating to EN-DC, but may correspond to NE-DC and/or NR-DC.

The DC processing unit 230 accesses the eNB 100 A and the gNB 100 B, respectively, and can execute setting in a plurality of layers (Media access control layer (MAC), radio link control layer (RLC), and packet data convergence protocol layer (PDCP), etc.) including RRC.

The control unit 240 controls each functional block constituting the UE 200. In particular, in this embodiment, the control unit 240 executes transmission/reception of an RRC message by the RRC processing unit 220 and control concerning DC by the DC processing unit 230.

Specifically, the control unit 240 may encode the cell ID (NR PCI, NR CGI, gNB ID, or condReconfigId) of the target PSCell that meets the conditions for addition or modification at the RRC layer of the LTE and send the ULInformationTransferMRDC message described above or a new RRC message (bye-message) to the network with RRC Reconfiguration Complete.

The encoding of the cell ID of the target PSCell may be interpreted as processing necessary for inclusion in a ULInformationTransferMRDC message or a new RRC message, or as dual connectivity information (ULInformationTransferMRDC) or an RRC message including the cell ID (identification information).

(3) Operation of Radio Communication System

Next, the operation of radio communication system 10 will be described. Specifically, the operation of radio communication system 10 related to the conditional PSCell addition/change procedure of the conditional secondary cell (secondary node) will be described.

(3.1) Conventional Operation Examples and Problems

Figure 4A:
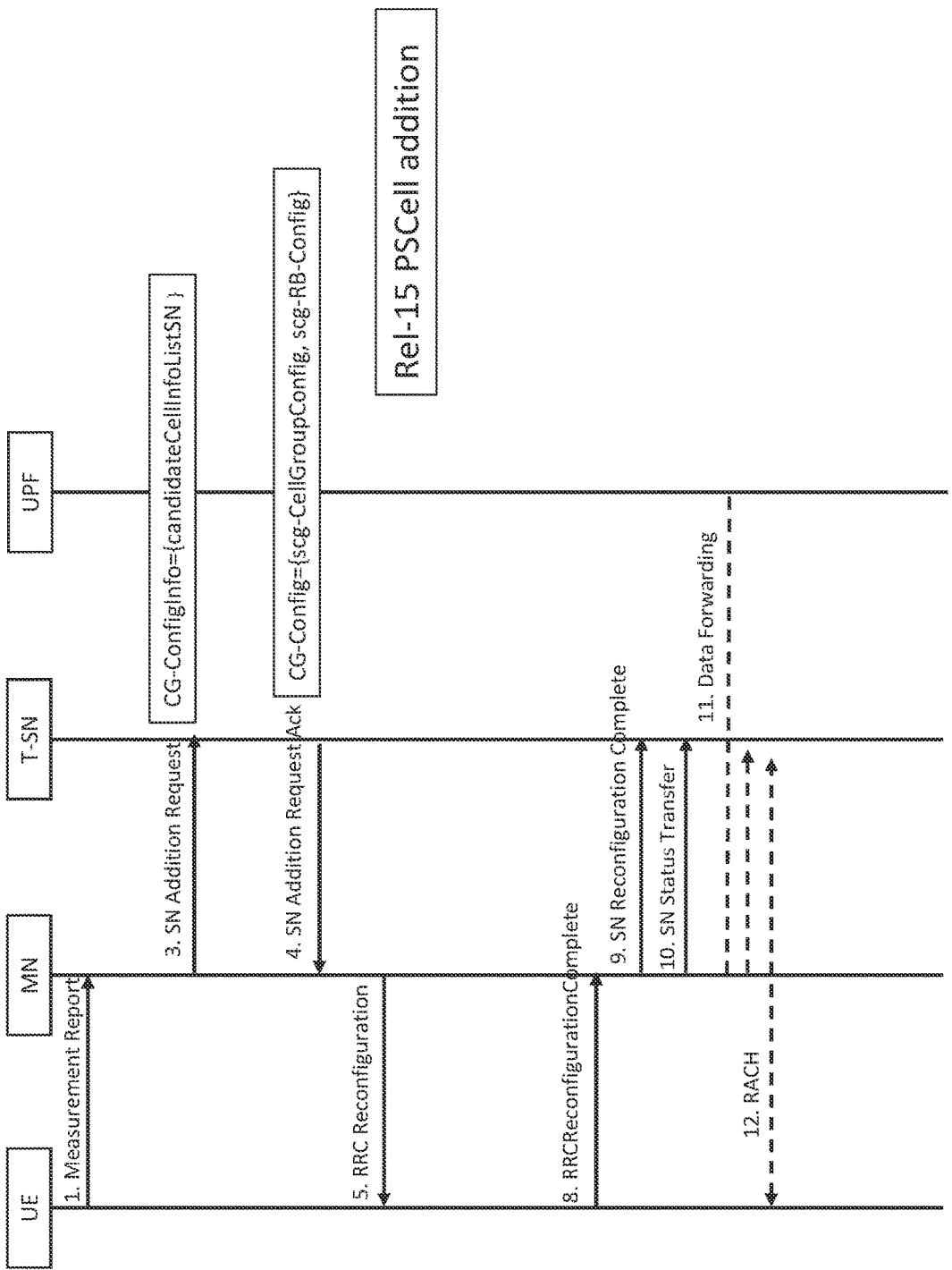
FIG. 4A illustrates an example communication sequence according to a conventional PSCell addition procedure.

FIG. 4A shows an example of a communication sequence according to a conventional PSCell addition procedure. Specifically, FIG. 4 A shows an example of a communication sequence according to the PSCell addition procedure specified in 3 GPP Release-15.

As shown in FIG. 4A, a conventional SN Addition Request Ack may include a CG-Config, which can send only one PSCell RRC Reconfiguration, i.e., the CG-Config corresponds to only one PSCell RRC Reconfiguration.

The SN Addition Request may include CG-ConfigInfo={candidateCellInfoListSN} and the SN Addition Request Ack may include CG-Config={scg-CellGroupConfig, scg-RB-Config}.

Figure 4B:
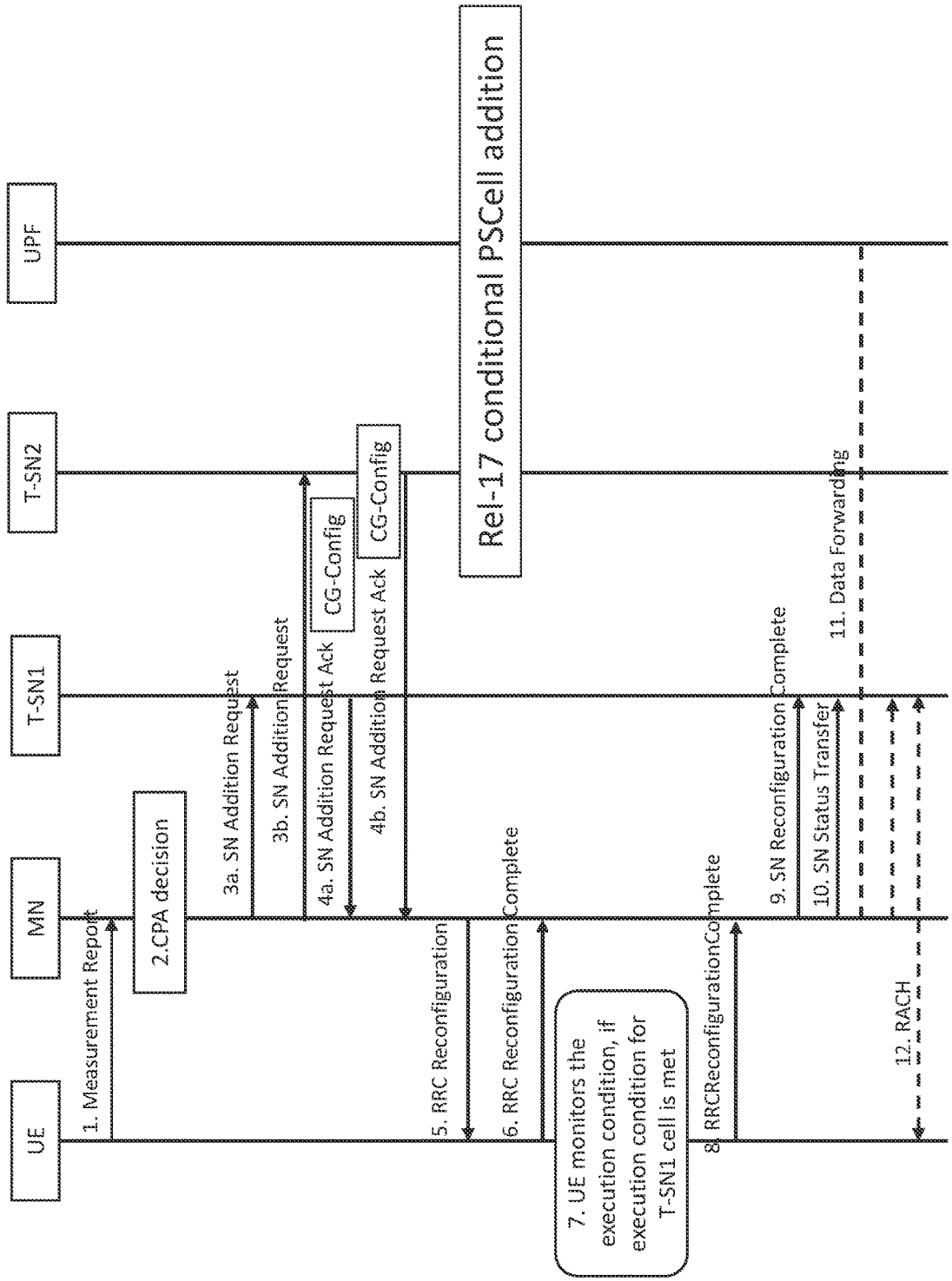
FIG. 4B is a diagram illustrating an example communication sequence according to a conventional conditional PSCell addition procedure.

FIG. 4B shows an example of a communication sequence according to a conventional conditional PSCell addition procedure. Specifically, FIG. 4 B shows an example of a communication sequence according to the conditional PSCell addition procedure of 3 GPP Release-17.

As shown in FIG. 4B, in the conditional PSCell addition (CPA), the MN (eNB 100 A) determines the propriety (necessity) of CPA based on the measurement report from the UE 200 (step 2).

Here, if the MN is eNB and the SN is gNB, the UE 200 monitors the execution condition, and if a target PSCell satisfying the execution condition exists, the UE 200 applies the RRC reconfiguration of the target PSCell, and returns the RRC Reconfiguration Complete containing the RRC reconfiguration ID (or (condReconfigId) of the applied target PSCell to the MN (steps 7 and 8).

As shown in FIG. 4B, the SN Addition Request Ack may include a CG-Config. Since multiple secondary nodes (T-SNs) may exist in a conditional PSCell addition, multiple CG-Configs may be sent to the MN.

However, each T-SN does not know how to transmit (notify) the PSCell configuration information (CG-Config) to the MN. In other words, even if an existing CG-Config is used, it is not easy to configure a plurality of PSCells.

The 3 GPP agrees that in the MN-initiated conditional inter-SN PSCell addition (CPA)/change (CPC), the MN need not indicate execution conditions to other related entities (For example, T-SN, S-SN), that in the case of CPA and MN-initiated conditional inter-SN PSCell change, the MN may generate a conditional configuration message (RRC Reconfiguration/RRC Connection Reconfiguration) and send it to the UE 200, that the RRC Reconfiguration provided by the candidate PSCell is encapsulated in a final conditional reconfiguration message to the UE 200, and that the MN is not permitted to modify the RRC Reconfiguration provided by the candidate PSCell.

(3.2) Example of Operation

In the following, there will be described some operation examples that can solve the above-mentioned problems related to the CG-Config of the conditional PSCell addition/change.

(3.2.1) Operation Example 1

The problems which this operation example can solve are as follows. Specifically, when the MN sends an SN Addition Request to the T-SN in a conditional PSCell addition, the T-SN may generate a plurality of PSCell configurations and send them back to the MN.

However, as shown in FIG. 4A, the CG-Config of the conventional SN Addition Request Ack can only transmit the RRC Reconfiguration of one PSCell. That is, how to send multiple candidate PSCell configurations (scg-CellGroupConfig, scg-RB-Config) to the MN is a problem.

In addition, it may be necessary to change or cancel the configuration (scg-CellGroupConfig, scg-RB-Config) of a plurality of candidate PSCells once transmitted from the T-SN to the MN, depending on the amount of traffic in the SN.

Figure 5:
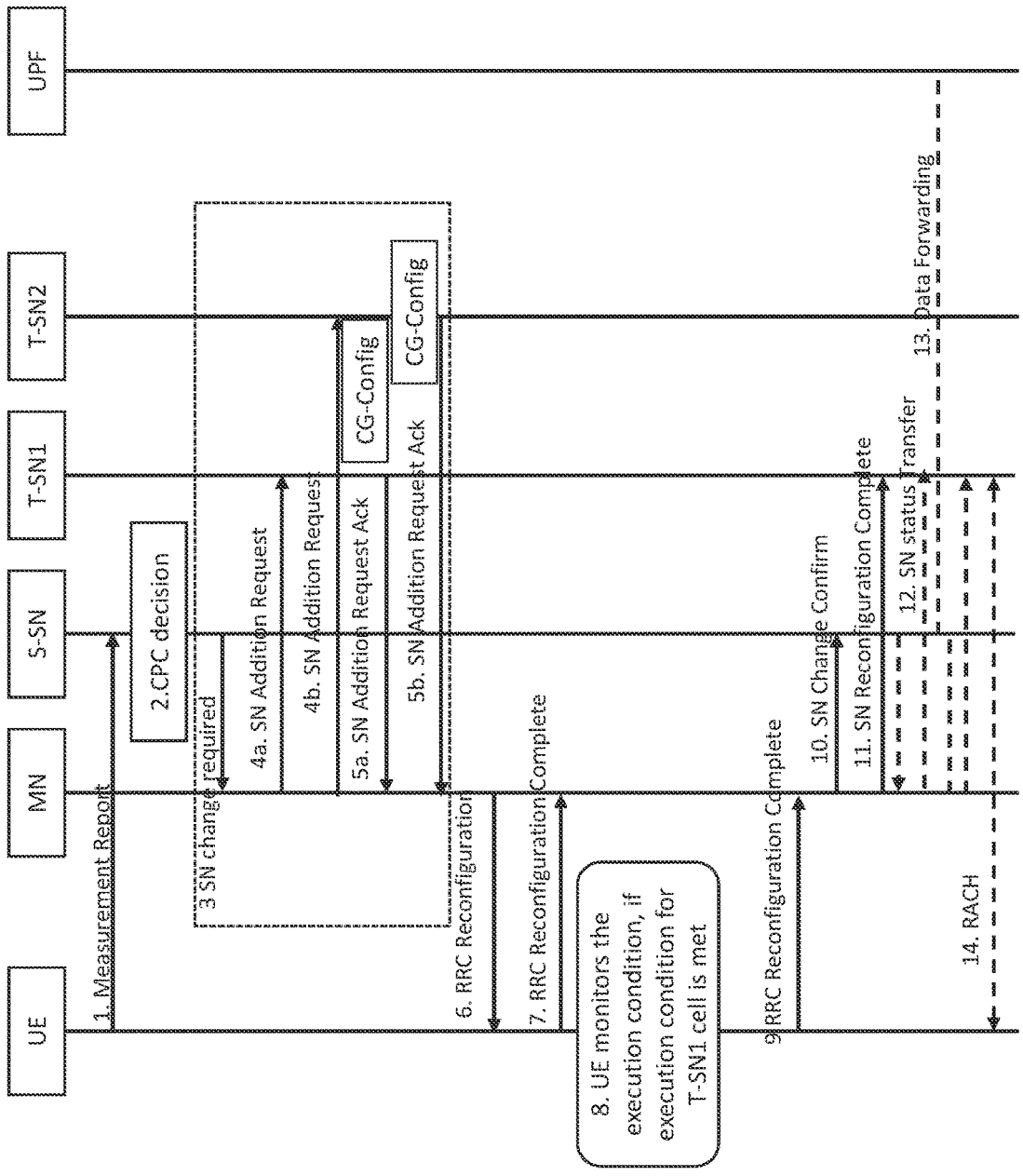
FIG. 5 is a diagram showing an example of a communication sequence according to a conditional PSCell change procedure according to an embodiment.

In this operation example, the above-described problem is solved by the following steps. FIG. 5 shows an example of a communication sequence according to the conditional PSCell change procedure according to this embodiment.

(i) A condSCG-CellGroupConfigToAddModList and a condSCG-RB-ConfigToAddModList may be created in the CG-Config. CellGroupConfigToAddModList may consist of multiple condSCG-CellGroupConfigs.

The condSCG-RB-ConfigToAddModList may consist of a plurality of condSCG-RB-Configs.

condSCG-CellGroupConfig may be configured by condSCG-CellGroupConfigId, pSCellID, scg-CellGroupConfig (RRC Reconfiguration).

Figure 6:
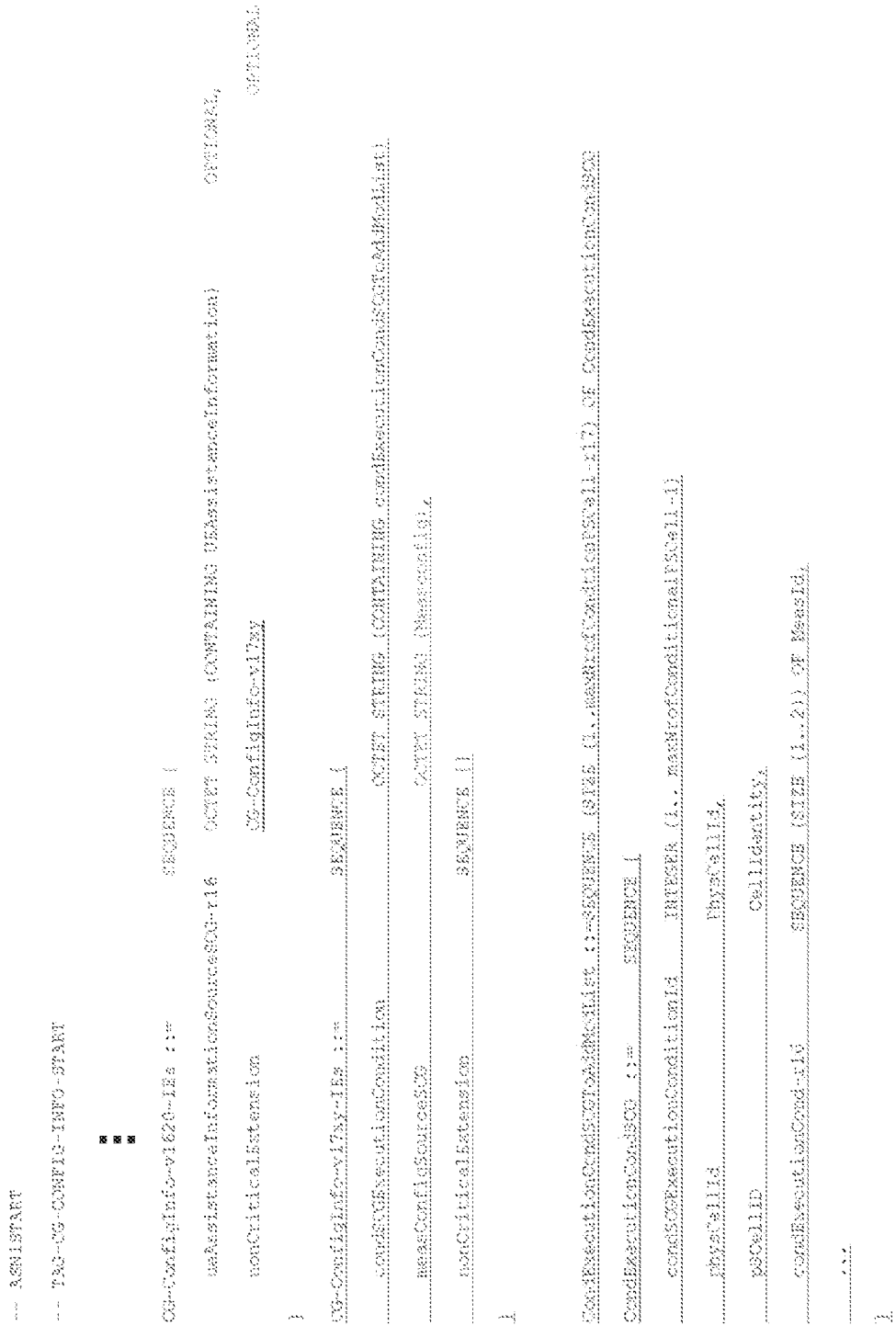
FIG. 6 is a diagram showing a configuration example of (a part of) CG-ConfigInfo.

The CondSCG-RB-Config may be configured by condSCG-RB-ConfigId, pSCellID, and scg-RB-Config (Radio-BearerConfig) (Specifically, see FIGS. 6, 7A and 7B).

(ii) S-NODE MODIFICATION REQUIRED (see e.g. 3 GPP TS 38.423) may be used if the configuration of multiple candidate PSCells is to be changed according to the amount of traffic in the SN.

The S-NODE MODIFICATION REQUIRED contains a CG-Config, which may be modified by changing the configuration of candidate PSCell using the condSCG-CellGroupConfigToAddModList and condSCG-RB-ConfigToAddModList described above.

Also, condSCG-CellGroupConfigToRemoveList and condSCG-RB-ConfigToRemoveList may be generated in the CG-Config, and a release/remove request may be sent to the MN.

The condSCG-CellGroupConfigToRemoveList may consist of multiple condSCG-CellGroupConfigIds. The condSCG-RB-ConfigToRemoveList may consist of multiple condSCG-RB-ConfigIds (Specifically, see FIGS. 6, 7A and 7B).

Since the MN-initiated conditional inter-SN PSCell change has a similar problem, the operation example described above may be applied.

(iii) In the SN-initiated conditional inter-SN PSCell change, the S-SN may generate an execution condition and notify the T-SN of the execution condition via the MN. The T-SN may generate a conditional PSCell configuration and combine that configuration with the execution condition received from the S-SN to generate a conditionalReconfiguration. The T-SN may transmit the generated conditional reconfiguration to the UE 200 via the MN. However, it is not clear what kind of signaling is used to realize the series of operations in (iii).

(iv) In the SN-initiated conditional inter-SN PSCell change, the SN generates an execution condition and transmits it to the MN. The MN may transmit the candidateCellInfoListSN received from the S-SN in step 3 to the T-SN in step 4*a*/5*a*. The T-SN may select candidate PSCell from candidate CellInfoListSN, generate candidate PSCell configuration, and send it to the MN. The MN may combine the execution condition received from the S-SN with the candidate PSCell configuration received from the T-SN to generate a conditionalReconfiguration and send it to the UE 200. However, it is not clear what kind of signaling is used to realize the series of operations in (iv).

(3.2.2) Example 2

The problems which this operation example can solve are as follows. Specifically, as shown in FIG. 5, in the SN-initiated conditional inter-SN PSCell change, the S-SN may generate an execution condition and notify the T-SN of the execution condition via the MN. The T-SN may generate a conditional PSCell configuration and combine that configuration with the execution condition received from the S-SN to generate a conditionalReconfiguration. The T-SN may send a conditionalReconfiguration to the UE 200 via the MN.

However, it is not clear what kind of signaling is used to realize such a series of operations (i).

As shown in FIG. 5, in the SN-initiated conditional inter-SN PSCell change, the SN may generate an execution condition and transmit it to the MN. The MN may transmit the candidateCellInfoListSN received from the S-SN in step 3 to the T-SN in step 4*a*/5*a*. The T-SN may select a candidate PSCell from the candidate CellInfoListSN, generate a candidate PSCell configuration, and send it to the MN. The MN may combine the execution condition received from the S-SN with the candidate PSCell configuration received from the T-SN to generate a conditionalReconfiguration and send it to the UE 200.

However, it is not clear what kind of signaling realizes such a series of operations (ii).

In this operation example, the above-described problems (i) and (ii) are solved by the following steps. This operation example will also be described with reference to FIG. 5.

(i) In step 3 of FIG. 5, condSCGExecutionCondition (condExecutionCondSCGToAddModList) may be generated in CG-Config during SN change required. A measConfigSourceSCG may be generated in the CG-Config.

The condExecutionCondSCG may consist of a condSCGExecutionConditionId, PCI, CGI, condExecutionCond.

The S-SN may use this information to send an execution condition associated with the PSCell ID to the MN. A condSCGExecutionCondition (CGI, PCI, condExecutionCond) and a measConfigSourceSCG may be generated in the CG-ConfigInfo included in the SN Addition Request in step 4*a*/4*b*.

The MN may use this information to transmit the execution condition generated by the S-SN to the T-SN. Also, candidateCellInfoListSN may be transmitted to T-SN at the same time. The T-SN may select candidate PSCell from candidate CellInfoListSN, combine the candidate PSCell configuration with the execution condition based on the PSCell ID, and generate a conditional Reconfiguration.

A conditionReconfigurationSCG may be generated in the CG-Config included in the SN Addition Request Ack of step 5 *a*/5 *b*, transparently transmit the conditionalReconfiguration to the MN, and the MN may transfer the conditionalReconfiguration to the UE 200.

(ii) In step 3 of FIG. 5, the conndSCGGExecutionConditionToAddModList may be generated in the CG-Config during SN change required.

The condSCGExecutionConditionToAddModList may consist of a condSCGExecutionConditionId, PCI, CGI, condExecutionCond.

The condSCG-CellGroupConfigToAddModList and condSCG-RB-ConfigToAddModList may be generated in the CG-Config included in the SN Addition Request Ack of Step 5*a*/5*b* and transmitted to the MN.

The MN may combine the PSCell IDs of the condSCG-DescriptionConditionToAddModList received from the S-SN and the PSCell IDs of the condSCG-CellGroupConfigToAddModList and the condSCG-RB-ConfigToAddModList received from the target SN to generate a conditionalReconfiguration. The MN may transfer the conditional reconfiguration to the UE 200.

(3.3) Configuration Examples of Information Elements

Next, a configuration example of the information element (IE) related to the CG-Config and CG-ConfigInfo described above will be described.

Specifically, FIG. 6 shows a configuration example of CG-ConfigInfo (partially). FIGS. 7A and 7B show an example of the configuration of a part of CG-Config.

The underlined portion of CG-Config and CG-ConfigInfo corresponds to the portion to be changed for the operation example described above.

CG-Config and CG-ConfigInfo are specified in 3 GPP TS 38.331. The description of each field contained in CG-Config and CG-ConfigInfo may be taken from the description of 3 GPP TS 38.331.

(4) Operational Effects

According to the embodiment described above, the following effects are obtained. Specifically, the radio base station (MN) receives the configuration information regarding the SCG (For example, CG-Config) and executes the conditional PSCell addition/change based on the configuration information. The radio base station can receive the configuration information including the execution conditions of the SCG and the identification information of the PSCell from the plurality of SNs.

Therefore, the radio base station (MN) can surely add or change the PSCell while corresponding to the plurality of configuration information transmitted from the SN.

In this embodiment, the radio base station can receive the configuration information from the S-SN and the T-SN. Therefore, it is possible to surely add or change the PSCell while corresponding to a plurality of configuration information transmitted from the S-SN and the T-SN, respectively.

In this embodiment, the radio base station can generate an RRC Reconfiguration based on the configuration information (For example, CG-Config) received from the S-SN and the T-SN and transmit the RRC Reconfiguration to the UE 200. Therefore, the conditional PSCell addition/change related to a plurality of PSCells can be reliably instructed to the UE 200.

(5) Other Embodiments

Although the contents of the present invention have been described by way of the embodiments, it is obvious to those skilled in the art that the present invention is not limited to what is written here and that various modifications and improvements thereof are possible.

For example, in the above embodiment, EN-DC in which MN is eNB and SN is gNB has been described as an example, but other DC may be used as described above. Specifically, it may be NR-DC where MN is gNB and SN is gNB, or NE-DC where MN is gNB and SN is eNB.

In the above embodiment, the conditional PSCell addition/change is mainly described as an example, but as described above, the same operation may be applied to the conditional inter-SN PSCell change procedure (MN-initiated conditional inter-SN PSCell change/SN-initiated conditional inter-SN PSCell change).

Although CG-Config and CG-ConfigInfo have been described as examples in the above-described embodiment, the configuration information relating to the secondary cell group of the conditional PSCell addition/change is not necessarily limited to CG-Config and CG-ConfigInfo, and may be other information.

Further, the block configuration diagrams (FIGS. 2 and 3) used for the description of the above-described embodiment show blocks in units of functions. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 8:
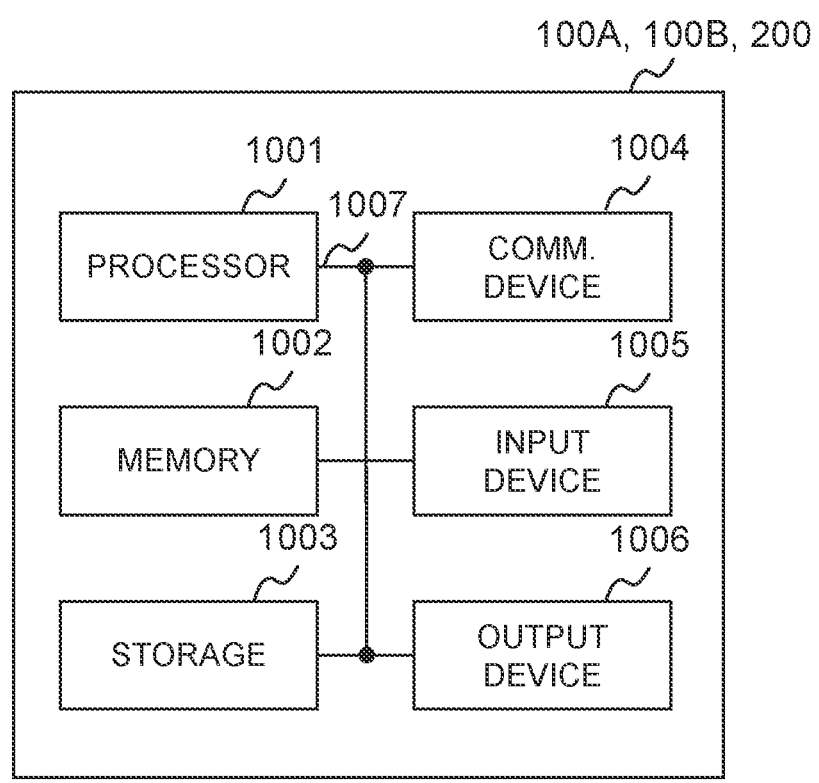
FIG. 8 shows an example of the hardware configuration of the eNB 100 A, gNB 100 B and UE 200.

Further, the above-mentioned eNB 100 A, gNB 100 B and UE 200 (the apparatus) may function as a computer that performs processing of the radio communication method of the present disclosure. FIG. 8 is a diagram showing an example of a hardware configuration of the apparatus. As shown in FIG. 8, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the device (see FIG. 2.3) is implemented by any hardware element or combination of hardware elements of the computer device.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, and the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side".). For example, terms an uplink channel, a downlink channel, or the like may be read as a side channel.

Similarly, the mobile station in the present disclosure may be read as a base station. In this case, the base station may have the function of the mobile station.

A radio frame may be composed of one or more frames in the time domain.

Each frame or frames in the time domain may be referred to as a subframe. A subframe may be further configured by one or more slots in the time domain.

The subframe may have a fixed time length (e.g., 1 ms) that does not depend on the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in time units greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain.

The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or a plurality of BWPs may be configured in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or "decision" may include regarding some action as "judgment" or "decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C".

Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS 10 radio communication system
20 E-UTRAN
30 NG RAN
100A eNB
100B gNB
110 radio communication unit
120 RRC processing unit
130 DC processing unit
140 control unit 200 UE
210 radio communication unit
220 RRC processing unit
230 DC processing unit
240 control unit
1001 processor
1002 memory
1003 storage
1004 communication device
1005 input device
1006 output device
1007 bus

The invention claimed is:

1. A radio base station comprising:
a receiver that receives, from a source secondary node from which a terminal is changed, a secondary node change request message including candidate cell information in a plurality of target secondary nodes which are candidates to which the terminal is changed, and an execution condition for the candidate cell; and
a processor that transmits a secondary node addition request message for the candidate cell information to each of the target secondary nodes based on the secondary node change request message, wherein
the receiver receives a secondary node addition request acknowledge message including the plurality of candidate cell information selected by each of the target secondary nodes, and
the processor transmits, to the terminal, a conditional reconfiguration message obtained by combining the execution condition received from the source secondary node and the candidate cell information received from each of the target secondary nodes, and determines the target secondary nodes to be added or changed, based on selected conditional reconfiguration ID included in a message received from the terminal.

2. The radio base station according to claim 1, wherein the receiver receives, from the target secondary node, a request message including information indicating deletion of a candidate cell included in the candidate cell information.

3. A radio communication system comprising a first radio base station and a second radio base station, wherein
the first radio base station is a source secondary node from which a terminal is changed, and includes a transmitter that transmits a secondary node change request message including candidate cell information in a plurality of target secondary nodes which are candidates to which the terminal is changed, and an execution condition for the candidate cell;
the second radio base station includes:
a receiver that receives the secondary node change request message; and
a processor that transmits a secondary node addition request message for the candidate cell information to each of the target secondary nodes based on the secondary node change request message, wherein
the receiver receives a secondary node addition request acknowledge message including the plurality of candidate cell information selected by each of the target secondary nodes, and
the processor transmits, to the terminal, a conditional reconfiguration message obtained by combining the execution condition received from the first radio base station and the candidate cell information received from each of the target secondary nodes, and determines the target secondary nodes to be added or changed, based on selected conditional reconfiguration ID included in a message received from the terminal.

4. A radio communication method for a radio base station comprising:
receiving, from a source secondary node from which a terminal is changed, a secondary node change request message including candidate cell information in a plurality of target secondary nodes which are candidates to which the terminal is changed, and an execution condition for the candidate cell;
transmitting a secondary node addition request message for the candidate cell information to each of the target secondary nodes based on the secondary node change request message;
receiving a secondary node addition request acknowledge message including the plurality of candidate cell information selected by each of the target secondary nodes;
transmitting, to the terminal, a conditional reconfiguration message obtained by combining the execution condition received from the source secondary node and the candidate cell information received from each of the target secondary nodes; and
determining the target secondary nodes to be added or changed, based on selected conditional reconfiguration ID included in a message received from the terminal.

* * * * *